United States Patent [19]

Shimaoka et al.

[11] Patent Number: 5,028,640

[45] Date of Patent: Jul. 2, 1991

[54] AROMATIC POLYCARBONATE RESIN COMPOSITION FOR MOLDING

[75] Inventors: Goro Shimaoka; Kenji Kouno, both of Kanagawa, Japan

[73] Assignee: Mitsubishi Gas Chemical Co. Inc., Tokyo, Japan

[21] Appl. No.: 442,106

[22] Filed: Nov. 28, 1989

[30] Foreign Application Priority Data

Nov. 28, 1988 [JP] Japan ................................ 63-298295

[51] Int. Cl.$^5$ ............................................ C08K 5/353
[52] U.S. Cl. ...................................... 523/205; 524/95; 524/611
[58] Field of Search .................... 523/205; 524/95, 611

[56] References Cited

U.S. PATENT DOCUMENTS

| | | | |
|---|---|---|---|
| 3,959,215 | 5/1976 | Schneider | 524/95 |
| 4,446,255 | 5/1984 | Ying et al. | 523/205 |
| 4,474,906 | 10/1984 | Nakama et al. | 523/205 |

FOREIGN PATENT DOCUMENTS

| | | | |
|---|---|---|---|
| 63-234058 | 9/1988 | Japan | 524/95 |
| 02-016162 | 2/1990 | Japan | 524/95 |

Primary Examiner—Lewis T. Jacobs
Attorney, Agent, or Firm—Sughrue, Mion, Zinn, Macpeak & Seas

[57] ABSTRACT

An aromatic polycarbonate resin composition for molding, comprising (a) an aromatic polycarbonate resin, (a) carbon fibers sized with an aromatic polycarbonate resin, and (c) an organic compound having at least two oxazoline rings per molecule is dislosed. The composition has excellent extrusion workability, mold deposit-preventing property and mechanical strength, and can be used as a molding material in the field of precision machines such as cameras, VTR's and facsimiles.

8 Claims, No Drawings

5,028,640

AROMATIC POLYCARBONATE RESIN COMPOSITION FOR MOLDING

FIELD OF THE INVENTION

This invention relates to an aromatic polycarbonate resin composition for molding. More particularly, it relates to an aromatic polycarbonate resin composition for molding, comprising carbon fibers sized using an aromatic polycarbonate resin, and an organic compound having at least two oxazoline rings per molecule The composition causes very little mold deposit at molding, and shows various excellent performances such as dimensional stability, mechanical strength, heat resistance and electrical characteristics. Therefore, the composition of this invention can be advantageously used in many industrial fields such as cameras, VTR's, facsimiles, and the like.

BACKGROUND OF THE INVENTION

Conventionally, polycarbonate resins reinforced with carbon fibers have various excellent performances, but have a disadvantage that deposits tend to adhere to a mold at molding thereof. In particular, in the case that the mold structure is complicated, e.g., in the production of precision machinery parts, this tendency is strong Therefore, disassembly and cleaning of the mold are required, and continuous molding operation over a long period of time is impossible.

As a result of investigating the cause of such mold deposit, it was found that an epoxy resin, a urethane resin or other resin used as a sizing agent for carbon fibers decomposes or volatilizes during molding to adhere to the mold, causing the mold deposit.

In general, several thousand carbon fiber monofilaments are bundled, and a sizing agent for carbon fibers is applied thereto in an amount of 2.5 to 7.0% by weight, followed by drying to fix the agent. If the amount of the sizing agent applied is below 2.5% by weight, the carbon fibers desize to form pills at the time of mixing thereof with a polycarbonate resin, so that the extrusion workability of the resulting composition becomes extremely poor. On the other hand, if the amount of the sizing agent exceeds 7.0% by weight, the dispersibility of the carbon fibers into a polycarbonate resin becomes so poor that the resulting composition gives extrudates having poor appearance, although the mixing and extruding operations per se can be satisfactorily conducted. The amount of the sizing agent applied is determined from the balance between workability and dispersibility, but this sizing agent is the cause of the mold deposit.

Therefore, a carbon fiber-reinforced polycarbonate resin composition which satisfies both the workability and appearance requirements and causes no mold deposit has been strongly demanded.

SUMMARY OF THE INVENTION

The present inventors have conducted intensive studies to eliminate the above-described drawbacks of the conventional compositions, and as a result, this invention has been completed.

Accordingly, an object of the present invention is to provide an aromatic polycarbonate resin composition for molding, having various excellent properties.

The aromatic polycarbonate resin composition for molding according to the present invention comprises (a) an aromatic polycarbonate resin, (b) carbon fibers sized with an aromatic polycarbonate resin, and (c) an organic compound having at least two oxazoline rings per molecule, the content of the component (a) in the composition being from 94 to 49% by weight, the content of the component (b) in the composition being from 5 to 50% by weight, and the content of the component (c) in the composition being from 0.01 to 5% by weight.

In one preferred embodiment of this invention, the carbon fibers (b) are carbon fibers (b)' obtained by treating carbon fibers with a sizing agent solution containing the aromatic polycarbonate resin and the organic compound (c) having at least two oxazoline rings per molecule in the weight ratio of from 99.5/0.5 to 95/5.

In another preferred embodiment of this invention, the carbon fibers (b) ar carbon fibers (b)" obtained by treating carbon fibers with a solution of the organic compound (c) having at least two oxazoline rings per molecule, and then sizing the resulting carbon fibers with a solution of the aromatic polycarbonate resin.

DETAILED DESCRIPTION OF THE INVENTION

The aromatic polycarbonate resin (a) which can be used in this invention is a resin prepared by the same method as used to produce conventional polycarbonate resins, that is, the reaction of an aromatic dihydric phenol-type compound with phosgene or a carbonic acid diester. The aromatic polycarbonate resin, which is a homo- or copolymer, used in this invention preferably has a viscosity-average molecular weight in the range of from 19,000 to 30,000.

Examples of the aromatic dihydric phenol-type compound include 2,2-bis(4-hydroxyphenyl)propane (i.e., bisphenol A), tetramethylbisphenol A, tetrabromobisphenol A, tetraethylbisphenol A, bis(4-hydroxyphenyl)methane, 1,1-bis(4-hydroxyphenyl)ethane, 2,2-bis(4-hydroxyphenyl)butane, 1,1-bis(4-hydroxyphenyl)cyclohexane, 1-phenyl-l,l-bis(4-hydroxyphenyl)ethane, bis(4-hydroxyphenyl)-p-diisopropylbenzene and 4,4-dihydroxydiphenyl. Those can be used alone or as mixtures thereof.

A molecular weight modifier is used in the reaction of the aromatic dihydric phenol-type compound with phosgene or carbonic acid diester to produce the aromatic polycarbonate resin, and conventional monohydric phenol-type compounds are generally used. Examples thereof include phenol; p-tertbutylphenol; tribromophenol; long chain alkyl-substituted phenols such as octyl phenol, nonyl phenol and lauryl phenol; long chain alkyl esters of hydroxybenzoic acid such as octyl hydroxybenzoate, lauryl hydroxybenzoate and nonyl hydroxybenzoate; and (long chain alkyl)oxyphenols such as octyl ether phenol (i.e., octyloxyphenol), nonyl ether phenyl and lauryl ether phenol. The amount of the molecular weight modifier used is in the range of from 1 to 10 mol%, preferably from 2.0 to 3.5 mol%, per mole of the dihydric phenol-type compound used.

The aromatic polycarbonate resin may have a branched structure. Examples of a branching agent which can be used in the reaction of the dihydric phenol-type compound to produce such branched polycarbonate resin include polyhydroxy compounds such as phloroglucinol, 2,6-dimethyl-2,4,6-tri(4-hydroxyphenyl)heptene-3, 4,6-dimethyl-2,4,6-tri(4-hydroxyphenyl)heptene-2,4,6-dimethyl-2,4,6-tri(4-hydroxyphenyl)haptene, 1,3,5-tri(4-hydroxyphenyl)benzene and 1,1,1-tri(4-hydroxyphenyl)ethane, and further include 3,3-bis(4-hydroxyaryl)oxyindole (i.e., isatin bisphenol), 5-chloroisatin, 5,7-dichloroisatin and 5-bromoisatin. The amount of the branching agent used is in the range of from 0.02 to 1.0 mol% per mole of the dihydric phenol-type compound used.

The amount of the component (a) is from 94 to 49% by weight, preferably from 91 to 59% by weight, based on the weight of the composition.

Component (b) which can be used in this invention is carbon fibers obtained by using an aromatic polycarbonate resin as a sizing agent. The carbon fibers used in this invention are different from conventional carbon fibers obtained by using conventional sizing agent such as an aqueous solution of an epoxy resin, a urethane resin, an acrylic resin, or the like.

Examples of the polycarbonate resin used for sizing are the same aromatic polycarbonate resins as in component (a) described above, and of those, a polycarbonate resin obtained by using bisphenol A is particularly preferred.

Examples of a method for producing carbon fibers sized with such a polycarbonate resin are a method in which carbon fibers are dipped in a solution of the polycarbonate resin in a solvent such as methylene chloride, and then dried, a method in which such a solution is applied to carbon fibers, and then dried, and the like.

The amount of the polycarbonate resin adhered to the carbon fibers for sizing the carbon fibers is selected from the range of from 1.0 to 10% by weight, preferably from 3.0 to 9% by weight, based on the weight of the carbon fibers. If the amount of the aromatic polycarbonate resin adhered as a sizing agent to the carbon fibers is below 1.0% by weight, such carbon fibers desize to form pills at the mixing thereof with the aromatic polycarbonate resin (a), resulting in poor extrusion workability of the composition. In sizing carbon fibers, an epoxy resin, urethane resin, acrylic resin or other resins may be used in combination with the aromatic polycarbonate resin in such a small amount that a mold deposit does not occur, i.e., less than 2.5% by weight.

The amount of the carbon fibers, component (b), used in the composition of this invention is in the range of from 5 to 50% by weight, preferably from 8 to 40% by weight, based on the total weight of the composition. If the amount of the carbon fibers is below 5% by weight, the resulting composition has poor strength, stiffness and dimensional stability. If the amount thereof exceeds 50% by weight, the flowability of the composition becomes poor, resulting in difficulty to mold the composition, and further abrasion of molds and cylinders becomes severe, causing economic losses.

According to this invention, other fillers and reinforcing materials may of course be used in combination with the carbon fibers of component (b), in order to improve the anisotropy and other properties of molded articles obtained from the composition. Such fillers and reinforcing materials can be in the form of fibers, plates, flakes or powder. Specific examples thereof include silica, alumina, titanium oxide, calcium sulfate powder, gypsum, gypsum whiskers, barium sulfate, talk, mica, asbestos, glass beads, glass flakes, calcium silicate, carbon black, graphite, iron powder, copper powder, molybdenum disulfide, silicon carbide, silicon carbide fibers, silicon nitride, silicon nitride fibers, brass fibers, stainless steel fibers, potassium titanate fibers, potassium titanate whiskers and aromatic polyamide fibers.

The organic compound (c) having at least two oxazoline rings per molecule used in the composition of this invention is a compound in which at least two oxazoline rings are bonded to an aliphatic or aromatic group, and is represented by the following formula (I):

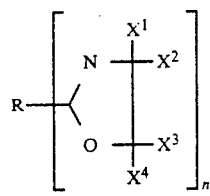

wherein R represents a hydrocarbon group comprising either or both of an aliphatic group and an aromatic group; $X^1$, $X^2$, $X^3$ and $X^4$ each represents a hydrogen atom or a lower alkyl group; and n is an integer of 2 or larger. Typical examples of this organic compound are condensation products of polycarboxylic acids or derivatives thereof such as chlorides with 2-aminoalcohols.

Specific examples of the condensation products of dicarboxylic acids or chlorides thereof with 2-aminoalcohols are isophthalic acid derivatives such as 1,3-bis(2-oxazolin-2-yl)benzene and 1,3-bis(4,4-dimethyl-2-oxazolin-2-yl)benzene, and terephthalic or phthalic acid derivatives corresponding to the above isophtalic acid derivatives; naphthalene dicarboxylic acid derivatives, for example, naphthalene-1,4-dicarboxylic acid derivatives such as 1,4-bis(2-oxazolin-2-yl)naphthalene and 1,4-bis(4,4-dimethyl-2-oxazolin-2-yl)naphthalene; succinic acid derivatives such as 1,3-bis(2-oxazolin-1-yl)ethane and 1,3-bis(4,4-dimethyl-2-oxazolin-2-yl)ethane; glutaric acid derivatives such as 1,3-bis(2-oxazolin-2-yl)propane and 1,3-bis(4,4-dimethyl-2-oxazolin-2-yl)propane; and adipic acid derivatives such as 1,4-bis(2-oxazolin-2-yl)butane and 1,4-bis(4,4-dimethyl-2-oxazolin-2-yl)butane. Specific examples of condensates derived from tricarboxylic acids include trimellitic acid derivatives such as 1,2,4-tris(2-oxazolin-2-yl)benzene. Preferred of those are the isophthalic acid derivatives and the terephthalic acid derivatives.

The amount of component (c) used in the composition of this invention is from 0.01 to 5% by weight, preferably from 0.1 to 3% by weight, based on the weight of the composition. If the amount of component (c) is below 0.01% by weight, the resulting composition cannot show sufficiently improved strength. If the amount thereof exceeds 5% by weight, the component (c) undesirably decomposes during molding of the resulting composition at high temperature, so that the strength of the molded articles is impaired.

In the preferred embodiments of this invention, component (c) is included in the above-described component (b). In such cases, carbon fibers are treated with a solution of an aromatic polycarbonate resin and component (c) in the weight ratio of from 99.5/0.5 to 95/5 to give carbon fibers (b)', which are then mixed with component (a); or carbon fibers are treated beforehand with a solution of component (c) to adhere the component (c) to the carbon fibers, and the resulting carbon fibers are then sized with an aromatic polycarbonate resin to give carbon fibers (b)'', which are then mixed with component (a). The use of the carbon fibers (b)' or (b)'' as described above is advantageous in that component (c) can exhibit its effects even when the amount thereof used is relatively small.

As described above, the composition of the present invention comprises, as essential ingredients, components (a), (b) and (c), or components (a) and (b)', or components (a) and (b)''. If the composition consists of components (a) and (b) only, i.e., not containing component (c), such composition has a problem that molded articles obtained from the composition have poor strength as compared with conventional carbon fiber-reinforced articles, although the composition can exhibit excellent performances in extrusion workability, appearance of molded articles, mold deposit and the like. In contrast to this, use of component (c) improves the strength of molded articles while retaining the above-described improved properties, i.e., extrusion workability, appearance of molded articles and mold deposit.

The method for preparing the composition of this invention can be conventionally employed methods, and is not particularly limited. Methods suitably employed in industrial preparation are a method in which components (a), (b) and (c), or components (a) and (b)', or components (a) and (b)'' are sufficiently mixed with each other together with other suitable additives by a mixing means such as a V-blender, and the resulting mixture is then formed into pellets by a single-screw vented extruder; a method in which components (a) and (c) are mixed beforehand together with other suitable additives by a powerful mixing means such as a super mixer, and the resulting mixture is then subjected to extrusion with a twin-screw vented extruder while feeding component (b), (b)' or (b)'' in the course of the extrusion, whereby the ingredients are mixed and formed into pellets.

If desired and necessary, various additives may of course be added to the aromatic polycarbonate resin composition of this invention. Such additives include lubricating agents such as fatty acid esters, paraffin wax and silicone oil; internal plasticizers such as polyethylene, ABS and polyethylene terephthalate; and other additives such as a heat stabilizer, an antioxidant, a light stabilizer, a colorant and an antistatic agent.

As explained above and as will be demonstrated in the following Examples and Comparative Examples, the composition of this invention has excellent extrusion workability and mold deposit-preventing property and also has excellent mechanical strength.

Therefore, the composition of the present invention can be usually used as a molding material in the field of precision machines such as cameras, VTR's and facsimiles.

The present invention will be described in more detail by reference to the following Examples and Comparative Examples, which should not be construed to be limiting the scope of the invention.

EXAMPLES 1 TO 4 AND COMPARATIVE EXAMPLES 1 TO 7

80 Parts by weight of a bisphenol A polycarbonate resin powder (manufactured by Mitsubishi Gas Chemical Company, Inc., Japan; trade name, Iupilon S-2000; viscosity-average molecular weight, 25,000) was mixed with 20 parts by weight of carbon fibers (manufactured by Toho Rayon Co., Ltd., Japan; trade name, Besfite HTA) treated with each of various sizing agents. To each of the resulting mixtures was added 1,3-phenylene-bis-2-oxazoline in an amount shown in the Table below, each amount being based on the total amount of the composition. Each of the resulting mixtures was stirred with a tumbler and then extruded into pellets by a single-screw vented extruder. In the above procedures, the various kinds of carbon fibers were evaluated for the sizing state after the carbon fibers were mixed with the polycarbonate resin powder, and the results obtained are shown in the Table below.

The pellets obtained above were dried at 120° C. for 5 hours in a circulating air oven, and then using an injection molding machine, Neomat 110/45, manufactured by Sumitomo Heavy Industries, Ltd., Japan, the dried pellets were molded into test pieces at a resin temperature of 280 to 300° C., a mold temperature of 80° to 100° C. and an injection pressure of 1,000 kg/cm$^2$.

The thus-obtained molded test pieces were evaluated for strength, and the results obtained are shown in the Table below.

Deposit preventing property was evaluated as follows. In a test tube test, 3 g of each kind of pellets were placed in a test tube and then heated at 340° C. for 1 hour, and the amount of materials adhered to the wall of the test tube was checked. In a mold test, each kind of pellets was subjected to 200 shot continuous molding, and the amount of materials adhered to the mold was checked. The results obtained are shown in the Table below.

The evaluation of deposit preventing property is based on the following criteria. Deposit preventing property (test tube and mold)

O: no adherent
Δ: small amount of adherent
x : considerable amount of adherent

TABLE

|  | Comparative Example 1 | Comparative Example 2 | Comparative Example 3 | Comparative Example 4 | Comparative Example 5 | Example 1 | Example 2 | Comparative Example 6 | Comparative Example 7 | Example 3 | Example 4 |
|---|---|---|---|---|---|---|---|---|---|---|---|
| Sizing agent |  |  |  |  |  |  |  |  |  |  |  |
| Type | — | Epoxy | Epoxy | Urethane | PC | PC | PC | PC | PC/E | PC/E | PC/E |
| Amount (wt %)*1 | — | 7 | 7 | 2.5 | 8.5 | 8.5 | 8.5 | 8.5 | 5.5/1.5 | 5.5/1.5 | 5.5/1.5 |
| Oxazoline (wt %)*2 | — | O | 1.0 | O | O | 0.5 | 1.0 | 7.0 | O | 0.5 | 1.0 |
| Sizing state | Pill | Good | Good | Good | Good | Good | Good | Good | Good | Good | Good |
| Strength |  |  |  |  |  |  |  |  |  |  |  |
| Tensile strength (kg/cm$^2$) | — | 1,500 | 1,750 | 1,450 | 1,350 | 1,550 | 1,600 | 1,500 | 1,200 | 1,500 | 1,550 |
| Bending strength (Kg/cm$^2$) | — | 2,000 | 2,400 | 1,900 | 1,850 | 2,150 | 2,250 | 2,100 | 1,700 | 2,100 | 2,100 |
| Deposit preventing |  |  |  |  |  |  |  |  |  |  |  |

TABLE-continued

|  | Comparative Example 1 | Comparative Example 2 | Comparative Example 3 | Comparative Example 4 | Comparative Example 5 | Example 1 | Example 2 | Comparative Example 6 | Comparative Example 7 | Example 3 | Example 4 |
|---|---|---|---|---|---|---|---|---|---|---|---|
| property |  |  |  |  |  |  |  |  |  |  |  |
| Test tube | — | X | X | Δ | O | O | O | Δ | O | O | O |
| Mold | — | X | X | Δ | O | O | O | — | O | O | O |

Notes
PC: Polycarbonate
PC/E: Polycarbonate/Epoxy
*[1] Based on carbon fibers
*[2] Based on the composition While the invention has been described in detail and with reference to specific embodiments thereof, it will be apparent to one skilled in the art that various changes and modifications can be made therein without departing from the spirit and scope thereof.

What is claimed is:

1. A polycarbonate resin composition for molding, which comprises (a) an aromatic polycarbonate resin, (b) carbon fibers sized with an aromatic polycarbonate resin, and (c) an organic compound having at least two oxazoline rings per molecule, the content of said component (a) in the composition being from 94 to 49% by weight, the content of said component (b) in the composition being from 5 to 50% by weight, and the content of said component (c) in the composition being from 0.01 to 5% by weight.

2. A polycarbonate resin composition for molding as claimed in claim 1, wherein said carbon fibers (b) are carbon fibers (b)' obtained by treating carbon fibers with a sizing agent solution containing the aromatic polycarbonate resin and an organic compound (c) having at least two oxazoline rings per molecule in the weight ratio of from 99.5/0.5 to 95/5.

3. A polycarbonate resin composition for molding as claimed in claim 1, wherein said carbon fibers (b) are carbon fibers (b)" obtained by treating carbon fibers with a solution of the organic compound (c) having at least two oxazoline rings per molecule, and then sizing the resulting carbon fibers with a solution of the aromatic polycarbonate resin.

4. A polycarbonate resin composition for molding as claimed in claim 1, wherein the amount of the aromatic polycarbopnate resin (a) is from 91 to 59% by weight.

5. A polycarbonate resin composition for molding as claimed in claim 1, wherein the aromatic polycarbonate resin (a) has a viscosity average molecular weight of 19,000 to 30,000.

6. A polycarbonate resin composition for molding as claimed in claim 1, wherein the amount of the aromatic polycarbonate resin used for sizing carbon fibers (b) is 1.0 to 10% by weight bases on the weight of the carbon fibers.

7. A polycarbonate resin composition for molding as claimed in claim 1, wherein the amount of the carbon fibers (b) is 8 to 40% by weight based on the weight of the composition.

8. A polycarbonate resin composition for molding as claimed in claim 1, wherein the organic compound (c) is represented by the formula

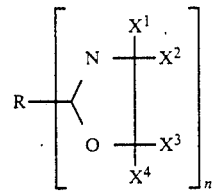

wherein R is a hydrocarbon group comprising an aliphatic group, an aromatic group or a combination thereof, $X^1$, $X^2$, $X^3$, and $X^4$ each represents a hydrogen atom or a lower alkyl group, and n is an integer of 2 or larger.

* * * * *